United States Patent
Devarakonda et al.

(10) Patent No.: US 7,945,613 B2
(45) Date of Patent: May 17, 2011

(54) METHOD FOR NON-DISRUPTIVELY ASSOCIATING APPLICATIONS AND MIDDLEWARE COMPONENTS WITH INFORMATION TECHNOLOGY INFRASTRUCTURE

(75) Inventors: Murthy V. Devarakonda, Peekskill, NY (US); Nikolai Joukov, Thornwood, NY (US); Hui Lei, Scarsdale, NY (US); Konstantinos Magoutis, New York, NY (US); Norbert G. Vogl, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 11/950,957

(22) Filed: Dec. 5, 2007

(65) Prior Publication Data

US 2009/0150472 A1      Jun. 11, 2009

(51) Int. Cl.
*G06F 15/16* (2006.01)
(52) U.S. Cl. ........................................ 709/201; 709/223
(58) Field of Classification Search .................. 709/201, 709/220–221, 223, 227, 238
See application file for complete search history.

(56) References Cited

U.S. PATENT DOCUMENTS

| | | | |
|---|---|---|---|
| 6,714,962 B1 * | 3/2004 | Helland et al. ................. | 709/203 |
| 6,996,599 B1 * | 2/2006 | Anders et al. .................. | 709/201 |
| 7,058,958 B1 | 6/2006 | Shutt et al. | |
| 7,093,261 B1 * | 8/2006 | Harper et al. .................. | 719/310 |
| 7,167,863 B2 * | 1/2007 | Ellis et al. ............................ | 1/1 |
| 7,454,660 B1 * | 11/2008 | Kolb et al. ....................... | 714/38 |
| 7,536,697 B2 * | 5/2009 | Wiseman et al. .............. | 719/315 |
| 7,698,398 B1 * | 4/2010 | Lai ................................. | 709/223 |
| 7,797,698 B2 * | 9/2010 | Diament et al. ............... | 717/175 |
| 2003/0041311 A1 * | 2/2003 | Poole et al. .................... | 717/100 |
| 2003/0074386 A1 | 4/2003 | Schmidt et al. | |
| 2003/0140333 A1 * | 7/2003 | Odaka et al. ................... | 717/115 |
| 2005/0149537 A1 | 7/2005 | Balin et al. | |
| 2005/0240654 A1 * | 10/2005 | Wolber et al. ................. | 709/206 |
| 2005/0278492 A1 | 12/2005 | Stakutis et al. | |
| 2007/0061461 A1 | 3/2007 | Hicks et al. | |
| 2007/0088630 A1 | 4/2007 | MacLeod et al. | |
| 2007/0100897 A1 | 5/2007 | Kelly et al. | |
| 2007/0124302 A1 | 5/2007 | Korn et al. | |
| 2008/0052719 A1 * | 2/2008 | Briscoe et al. ................. | 718/104 |
| 2009/0158246 A1 * | 6/2009 | Sifter et al. .................... | 717/105 |

* cited by examiner

*Primary Examiner* — Faruk Hamza
(74) *Attorney, Agent, or Firm* — Scully, Scott, Murphy & Presser, P.C.; Anne Dougherty

(57) ABSTRACT

A methodology is presented for discovering and storing end-to-end associations between different types of entities in a system configuration model of a distributed middleware system. First associations are determined, at each distributed system tier, between instances of data and data-container configuration elements. Those first associations point to logical subdivision of a data service that is directly responsible for implementing an instance of data. Second associations are determined, at said each distributed system tier, between said data-container configuration elements and a server infrastructure. Said second associations point to a server infrastructure that hosts said data-container configuration elements. Third associations are composed, within said each distributed system tier, between said instances of data and said server infrastructure, using said first associations and said second associations. Fourth associations are composed, end-to-end, which represent dependency of an application using said instances of data to said server infrastructure.

15 Claims, 4 Drawing Sheets

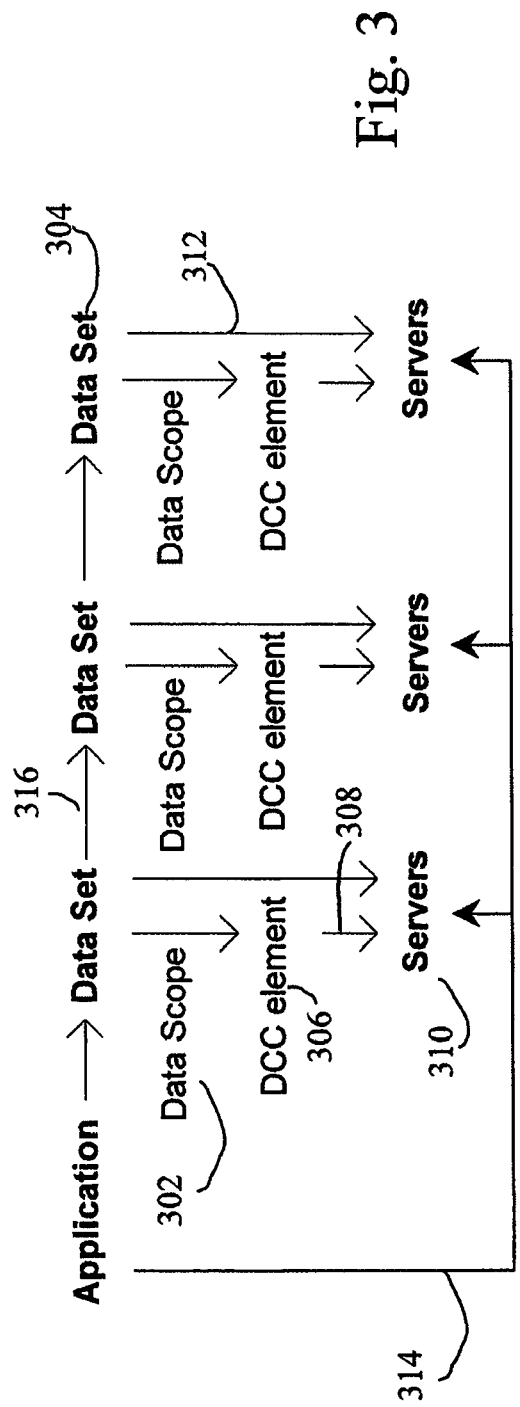
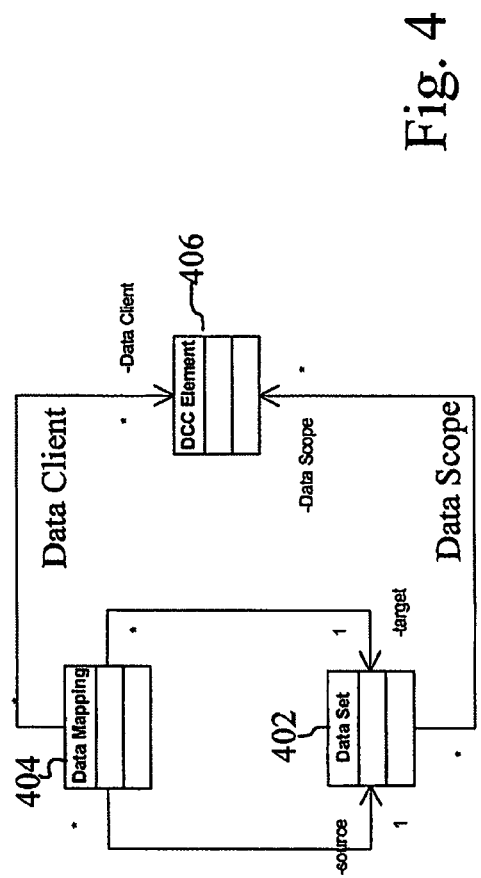

METHOD FOR NON-DISRUPTIVELY ASSOCIATING APPLICATIONS AND MIDDLEWARE COMPONENTS WITH INFORMATION TECHNOLOGY INFRASTRUCTURE

CROSS-REFERENCE TO RELATED APPLICATIONS

This application is related to U.S. patent application Ser. No. 11/455,573 filed on Jul. 25, 2006, and entitled "DATA LOCATIONS TEMPLATE BASED APPLICATION-DATA ASSOCIATION AND ITS USE FOR POLICY BASED MANAGEMENT", which is incorporated herein by reference in its entirety.

FIELD OF THE INVENTION

The present disclosure relates to software modeling, distributed system and Information Technology (IT) infrastructure discovery, and more particularly to associating applications and middleware components with IT infrastructure.

BACKGROUND OF THE INVENTION

Today's enterprise environments typically involve stacked middleware layers (business logic, application servers, database servers, storage servers, etc.) providing services to a number of business applications. Each middleware layer is a complex distributed system, often partitioned over multiple IT resources for performance and availability. As can be seen in the example shown in FIG. 2, a distributed J2EE application server (e.g., WebSphere) 202 and a database management system (e.g., DB2) 204 can be partitioned over a large pool of servers and shared by two applications 206, 208. In such environments, the resources used to serve a given application are typically a small subset of the overall pool.

The ability to accurately account for the IT infrastructure (servers, storage controllers, etc.) used by each business application enables a variety of important functions, such as:
1. Optimal alignment of the IT infrastructure to the business needs of the enterprise;
2. Ability to accurately predict which business application is expected to be impacted by a server or other IT infrastructure failure;
3. Ability to accurately estimate capacity requirements when planning migration of an application to a new infrastructure (e.g., during a technology refresh).

However, accurate mapping between business applications and the underlying IT infrastructure is hidden by intermediate virtualization and middleware layers, which interpose their services between the high-level (business) and low-level (servers, storage) tiers of the IT architecture.

Existing IT infrastructure discovery systems cannot offer a sufficient solution to the above problem as they typically discover and report only coarse-grain mappings of applications to the IT infrastructure. For example, consider an application A 206 that depends on application and database middleware services 202 and 204, as shown in FIG. 2. While it is possible that existing IT infrastructure discovery systems can narrow down application A's dependency to a specific cluster 210 of application servers, they lack the ability to continue drilling through a stack of subsequent middleware services (e.g., 204), maintaining the context of the specific application, and discovering the specific resources used by that application through all these tiers. As such, they typically assume that application A depends on the total IT infrastructure used to support 204.

Certain experimental research prototypes may provide finer-grain dependency information but are often based on active (e.g., fault injection) techniques and are thus disruptive to the IT environment. No existing infrastructure discovery system currently known to the inventors has the ability to accurately and non-disruptively drill inside each data service X and discover which fraction of X's infrastructure is actually used to support A. The methodology and system disclosed in the present disclosure offers a novel solution to this problem.

Basic infrastructure information about the target IT infrastructure (e.g., installed software and hardware components) is typically represented in the form of a System Configuration model, which is a standard representation compliant with a System Configuration meta-model such as the Common Information Model (CIM) or Service Modeling Language (SML).

In general, a meta-model is a precise definition of the constructs and rules needed for creating semantic models of particular entities. Another way to think about meta-models is as collections of "concepts" (e.g., things, terms, etc.) that make up a vocabulary with which one can talk about a certain domain. It is a similar concept to a "schema" as used in databases or XML, or to the definition of a class in object-oriented languages.

Standard System Configuration meta-models such as CIM or SML are vendor-independent and thus intentionally not very detailed. The Common Modeling Language (CML) is an effort to define interoperable, vendor agreed System Configuration meta-models—however, the CML effort is still in its infancy and its future unclear. System Configuration models are commonly populated by IT infrastructure discovery systems or manually.

Previous research projects have focused on methods for discovering end-to-end relationships in distributed systems, either by statistically analyzing system behavior, based on live activity or traces, or by using system support (e.g., passing tokens or other metadata over communication between layers). In addition, several commercial tools focus on discovery of infrastructure assets by scanning a range of IP addresses and querying the systems that respond. Additional refinement of asset discovery has been achieved through a template-driven discovery of applications. Network communication relationships among applications are discoverable by capturing network packets and analyzing their headers. However, these systems are either unable to discover accurate associations between business applications and the server infrastructure (in an end-to-end manner) or they can manage to do so in a way that is intrusive.

Various systems have investigated building distributed system dependency graphs using passive (e.g., trace collection and offline analysis) or active (e.g., fault injection) methods. Some of the uses of a dependency graph include problem determination, performance analysis, and visualization. Other systems trace the provenance of data to discover origin or data history. However, the provenance concept is evolving and distributed multi-tiered systems are beyond the scope of present provenance prototypes.

BRIEF SUMMARY OF THE INVENTION

A method and system for non-disruptively associating applications and middleware components with information technology infrastructure are provided. The method in one aspect, may comprise determining first associations, at each distributed system tier, between instances of data and data-container configuration elements. Said first associations point to logical subdivision of a data service that is directly responsible for implementing an instance of data.

The method may also comprise determining second associations, at said each distributed system tier, between said data-container configuration elements and a server infrastructure. Said second associations point to a server infrastructure that hosts said data-container configuration elements. The method may further include composing third associations, within said each distributed system tier, between said instances of data and said server infrastructure, using said first associations and said second associations. The method may yet still further include composing fourth associations, end-to-end, said fourth associations representing dependency of an application using said instances of data to said server infrastructure. The method may also include storing at least said third associations and said fourth associations, which for example can be used for analyzing system infrastructure.

A system for non-disruptively associating applications and middleware components with information technology infrastructure, in one aspect, may comprise a computer-implemented module operable to discover first associations, at each distributed system tier, between instances of data and data-container configuration elements, said first associations pointing to logical subdivision of a data service that is directly responsible for implementing an instance of data. The computer-implemented module may be further operable to discover second associations, at said each distributed system tier, between said data-container configuration elements and a server infrastructure, said second associations pointing to a server infrastructure that hosts said data-container configuration elements. A second computer-implemented module is operable to compose third associations, within said each distributed system tier, between said instances of data and said server infrastructure, using said first associations and said second associations. Said second computer-implemented module may be further operable to compose fourth associations, end-to-end, said fourth associations representing dependency of an application using said instances of data to said server infrastructure. A data repository is operable to store said first, second, third and fourth associations.

A program storage device readable by a machine, tangibly embodying a program of instructions executable by the machine to perform the above-described method steps may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 illustrates model entities, end-to-end compositions and associations in one embodiment.

FIG. 4 is a diagram showing a (Unified Modeling Language) UML representation of an example of the end-to-end associations described above.

DETAILED DESCRIPTION

Figure 1:
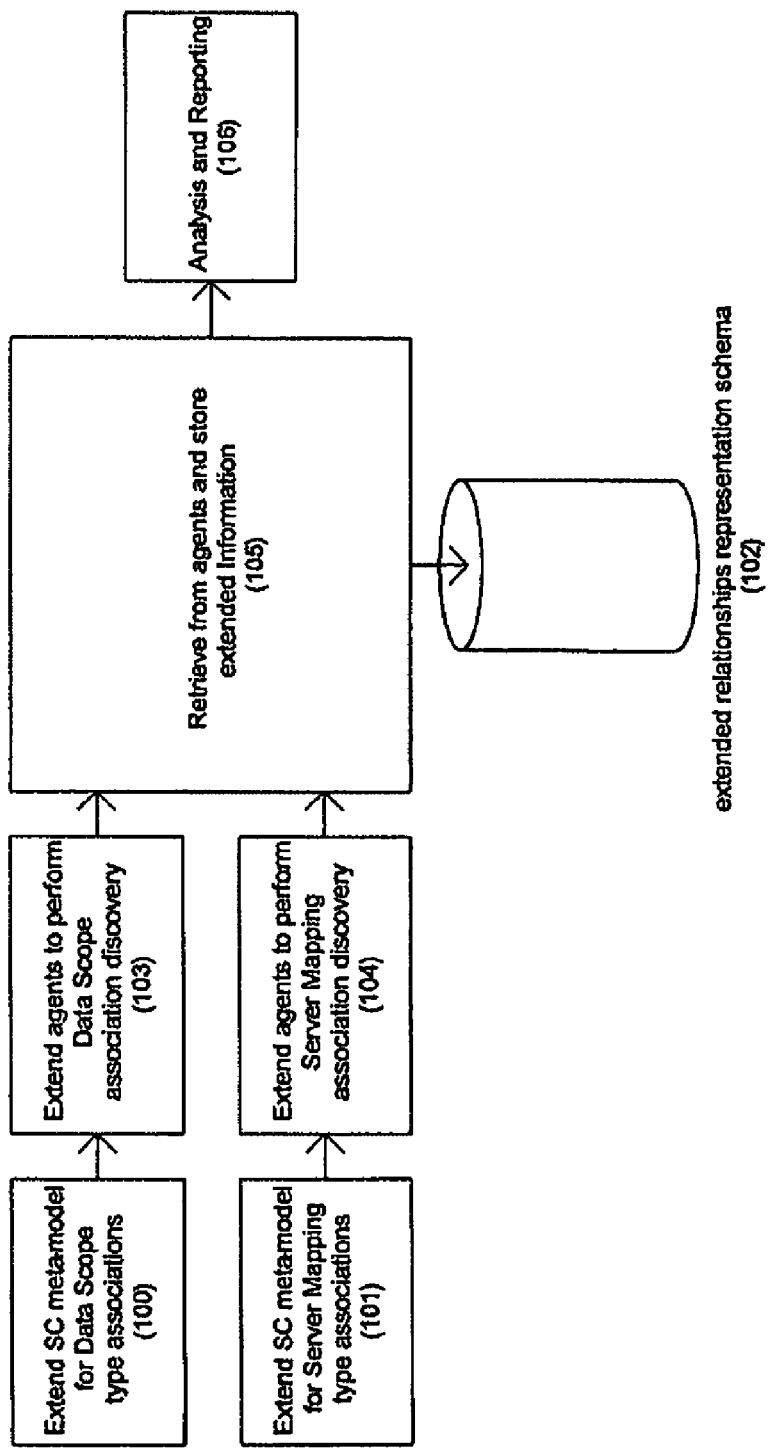
FIG. 1 illustrates the components of the present disclosure in one embodiment.
Figure 2:
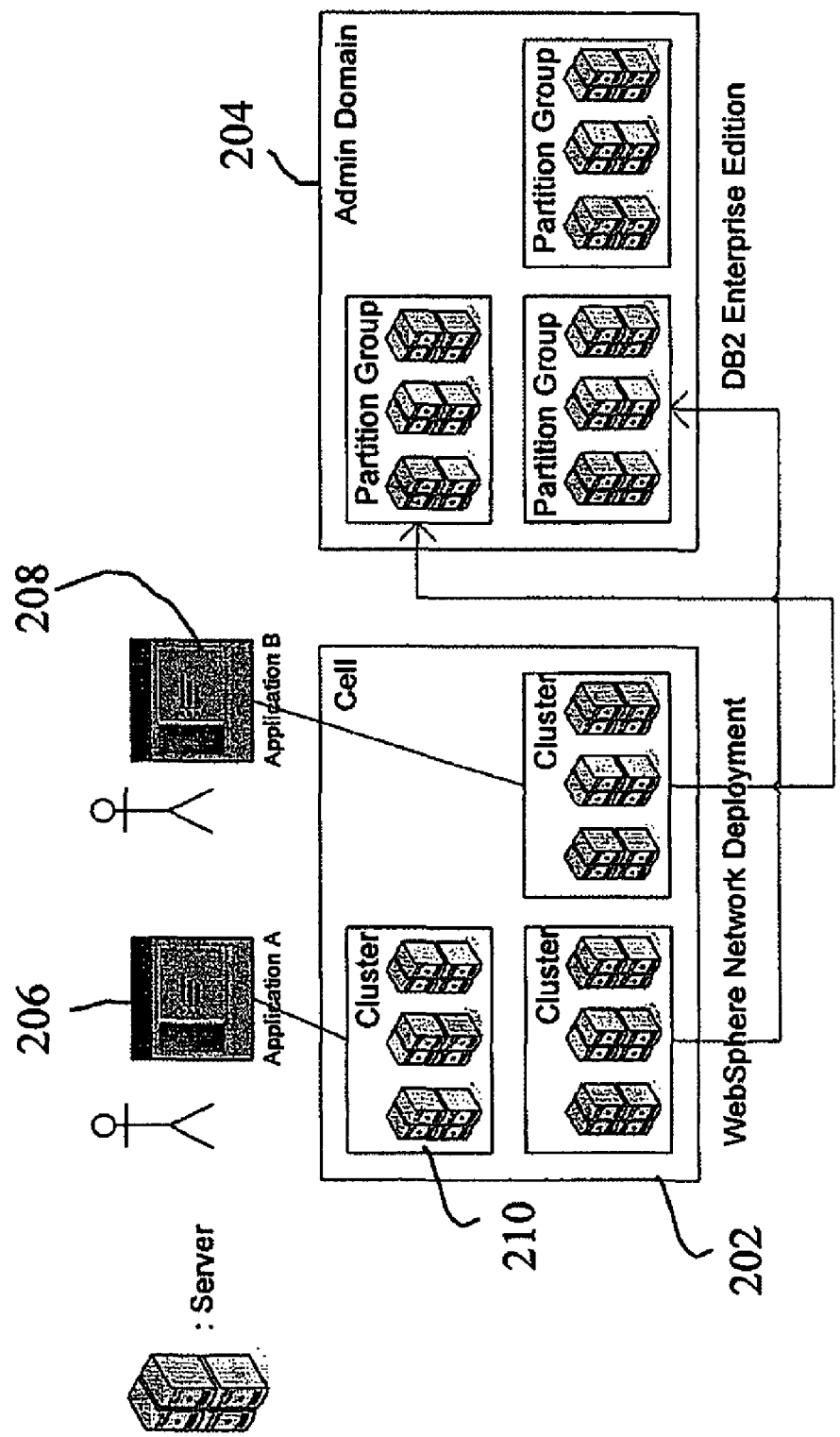
FIG. 2 shows an example of enterprise environment.

The present disclosure provides modeling constructs, runtime support, and methodology needed for discovering end-to-end relationships between applications and IT (server) infrastructure, for example, discovering end-to-end applications-data relationships through multiple middleware tiers, and for instance, discovering and storing end-to-end associations between different types of entities in a System Configuration model of a distributed middleware system. The types of entities may include:

1. Data, such as Enterprise Java Bean (EJB), DBMS table, file, etc;
2. Data-container configuration (DCC) elements, such as J2EE Cluster, Db2Tablespace, etc; and
3. Server infrastructure elements, such as Computer Systems.

DCC elements are software components responsible for implementing data, which are then consumed by upstream software components. They are administrative subdivisions of larger distributed middleware systems, which are generically termed Data Services. A Data Service comprises one or more DCCs. DCCs are typically units of performance or availability within a large Data Service.

FIG. 3 illustrates model entities, end-to-end compositions and associations in one embodiment. Associations 302 are defined or generated, at each distributed system tier, between instances of data (e.g., business objects, relational tables, files, etc.) 304 and DCC elements 306. Such an association is referred to as a Data Scope 302 and points to the logical subdivision of a Data Service that is directly responsible for implementing the particular instance of data. An example of a Data Scope association is between an Enterprise Java Bean (data) and the J2EE Application Server (DCC element) that implements it. Another example of a Data Scope association is between a database table and the particular DBMS tablespace or partition group that implements it.

Associations 308 are established, at each distributed system tier between DCC elements 306 and the server infrastructure (e.g., servers, storage controllers, etc.) 310. An example of distributed system tier may be a middleware system such as J2EE application server, or a database management system. Such an association is referred to as a Server Mapping and points to the server infrastructure that hosts the corresponding DCC software component. An example of such an association is between a J2EE Application Server (DCC element) and the Computer System (server infrastructure) that hosts it.

The present disclosure also provides compositions of the above associations 312, within each tier, producing new associations between data instances and the server infrastructure that implements them. In one embodiment, the production rules for producing new associations use the associative property: for a relation ~ and for any a, b, c, if a~b and b~c, then a~c. Further, the present disclosure provides compositions of the above associations 314, end-to-end, producing new associations that represent the overall dependency of a business application to the IT infrastructure as shown at 314. The new associations may be stored, for example, temporarily in memory or like for processing and/or in a more permanent storage device or like.

FIG. 4 is a diagram showing a Unified Modeling Language (UML) representation of an example of the end-to-end associations described above. The Data Set class 402 corresponds to 304 in FIG. 3 and represents some data entity (e.g., a business object, a database table, a file, etc.) in a distributed system. The Data Mapping class 404 corresponds to 316 in FIG. 3 and represents a mapping between a source and a target Data Set. The associations between Data Mapping 404 and Data Set 402 refer to the source and target Data Sets represented in the Data Mapping. The association (called Data Scope) between Data Set 402 and DCC Element 406 corresponds to 302 in FIG. 3 and refers to the DCC Element that implements the specific Data Set. The association (called DataClient) between Data Mapping 404 and DCC Element 406 refers to the DCC Element that "consumes" (i.e., is a client of) the specific Data Set. This association is not represented in FIG. 3.

Following is a description of how the UML diagram shown in FIG. 4 can be used to represent the end-to-end application-infrastructure relationships 314 shown in FIG. 3, in the following sequence of steps, in one embodiment:

1. An application is represented by a specific DCC element A.
2. The DCC element A is associated with a number of Data Mappings $M_1, \ldots, M_n$ through DataClient associations. This means that the application A is consuming the Data Sets that are the sources of these Data Mappings.
3. For each Data Mapping $M_j$, the source Data Set D1 of $M_j$ is associated with a target Data Set D2.
4. Each Data Set is associated with the DCC Element that implements it through a Data Scope association.
5. Each DCC Element is associated with a set of Servers through Server Mapping associations found in the System Configuration Model (not shown in FIG. 4).
6. Recursively, a target Data Set of one Data Mapping can become the source Data Set of another Data Mapping—thus this produces end-to-end relationships.
7. The DCC elements that are the Data Scopes of the above Data Sets, are also related in end-to-end relationships with the application A
8. The Servers that host the above DCC elements are as above also related in end-to-end relationships with the application.

The UML representation shown in FIG. 4 is related to FIG. 8 of U.S. patent application Ser. No. 11/455,573 through the Data Set class, which is a common entity in both representations. The data locations instance (DLI) meta-model described and shown in U.S. patent application Ser. No. 11/455,573 is utilized in one embodiment of the method for discovering end-to-end relationships between applications and data. The present application extends that application's DLI meta-model with the UML model shown in FIG. 4. Briefly, DLI meta-model described the data consumption and transformation of software components in the system infrastructure including installation-specific details. DLI model schema included reference attribute pointing to entities of the distributed system infrastructure captured in the SC model. DLI models were modeled to include, for example, absolute pathnames and machine names, references to deployed software or hardware elements using their names as listed in the SC model, for instance, described in the SC model of the distributed system, names of discovered data sets representing data use of software components, etc.

The disclosed method relies on collected system-configuration information only, without any tracing of system activity or any service unavailability imposed on the system. Thus, it is non-disruptive, compared to the active discovery methods (e.g., fault injection) employed in known methodologies.

FIG. 1 illustrates the components of the present disclosure in one embodiment. In item (100), a standard System Configuration meta-model is extended by the system modeler/architect by defining Data Scope ("implemented-by") type associations between data types and DCC types: e.g., "any instance of an Enterprise Java Bean (EJB) is implemented by either an instance of a J2EEApplicationServer or an instance of a J2EEApplicationServerCluster". In item (101), a standard System Configuration meta-model is extended by defining Server Mapping type associations and ensuring that the server dependency of a given DCC element can be derived for any DCC element. A System Configuration meta-model described and shown in U.S. patent application Ser. No. 11/455,573, for example, in FIG. 6 of that application, may be also extended with Data Scope and Server Mapping type associations as described above.

In an exemplary embodiment, Server Mapping associations are defined for a DCC element. For example, a DBMS table-space can be mapped to the DBMS table-space containers (storage volumes, file systems) that it comprises and subsequently to the Computer Systems hosting them. In a J2EE environment, a cluster of application servers can be mapped to its comprising servers and to the Computer Systems hosting them. In another words, end-to-end reachability is mapped. In one embodiment, enhancements to the associated discovery methods for populating Server Mapping associations are processed in item (104).

In item (102) in one embodiment, an application-data relationship representation is extended to include Data Scope associations. U.S. patent application Ser. No. 11/455,573 describes an example of application-data relationship representation that can be extended according to the method and system of the present disclosure. In some embodiments, this representation, for example, a UML data model implemented as a database schema, may be part of the System Configuration model. In such case, item (102) may be merged with item (100).

In item (103), agents are extended with methods for discovering values of Data Scope associations for any valid instance of Data. Scripts or computer instructions may be used also to discover and return Data Scope associations, in addition to Data Set to Data Set relationships. An example of such scripts or computer programs is described and shown in U.S. patent application Ser. No. 11/455,573, for instance, with reference to FIGS. 5 and 9 of that application. The Data Scope association discovered during a script invocation corresponds to the source Data Set fed to that invocation. For example, when invoking a script for the WebSphere™ application server with an EJB as a source Data Set, the script will return one or more target Data Sets (e.g., database tables) but also the Data Scope association for the EJB. The Data Scope typically points to the WebSphere cluster or application server that implements the EJB.

In item (104), agents are extended with methods for discovering values of Server Mapping associations for any valid instance of a DCC element in the System Configuration Model. Discovery of Server Mapping associations is implemented by performing a traversal of the System Configuration model, starting at a DCC element and ending at server elements, such as Computer System.

By discovering the Data Scope of each Data Set and combining with the end-to-end application-data associations shown in FIGS. 3 and 4, the system and method of the present disclosure enables collecting accurate information about the exact infrastructure supporting the application.

In item (105), discovery is performed in the manner, for example, described in U.S. patent application Ser. No. 11/455,573 with the Data Mapping rule scripts returning the augmented output, including Data Scope associations. Step 910 in U.S. patent application Ser. No. 11/455,573, FIG. 9 flow diagram is extended in this disclosure to handle augmented output from Mapping Rule scripts. Step 906 of the same patent application is extended in this disclosure to handle application-file relationships augmented with data-infrastructure dependencies collected from repeated invocations of extended step 910.

After discovery, a lookup of the per-application IT infrastructure can be performed via a query to the repository (e.g., relationship representation UML) shown in item (102).

The end-to-end relationships identified according to the methodology describe above can further be analyzed and reported. Such analysis and reporting allows project server usage on a per-application basis and reason as to whether the current server allocation reflects business priorities. In one embodiment, it is left up to a human operator to understand in what ways the application depends on the infrastructure. Such analysis and reporting also allows for predicting the effect of (if any, real or potential) server failure on specific applications, for instance, based on the type of dependence (whether it is maskable by redundancy, etc.) Briefly, type of dependence can take, for example, the form "application A will be unavailable for as long as server X is down", "application A's performance will be degraded for as long as server X is down", "application A's dependence on server X additionally depends on the number of backups server X has", etc. In all cases, application A depends on server X (and the system and method of the present disclosure can discover and report this dependence). Operators, human or otherwise, may determine the effect that X's availability has on A's availability and performance differences depending on a variety of secondary factors using the discovery information provided by the system and method of the present disclosure.

Further, the analysis can produce use per-application server-usage projection, in conjunction with basic technology specs (CPUs, disks, etc.), as an estimate of required capacity for application migration to new infrastructure. For example, in order to migrate a business application X from an Intel model Y environment to IBM pSeries model Z, a migration specialist can use the information that X is using 15 Intel servers along with the information that the performance/availability/power relationship between Intel model X and pSeries model Y is 3:1 (3 Intel X are equivalent to 1 pSeries Y, under the chosen metric) to recommend using 5 pSeries servers as equivalent capacity.

The methodology disclosed in the present application may relate to some of the approaches that have investigated building distributed system dependency graphs in that it also focuses on discovering dependency information; differs however, in that it expresses dependency specifically, as it relates to applications' use of data. Thus it provides a finer-grain scope than dependency between software components. Systems tracing the provenance of data are also related to the methodology of the present disclosure in that they establish a history of changes to data, and the history may include the applications that made the changes.

Figure 5:
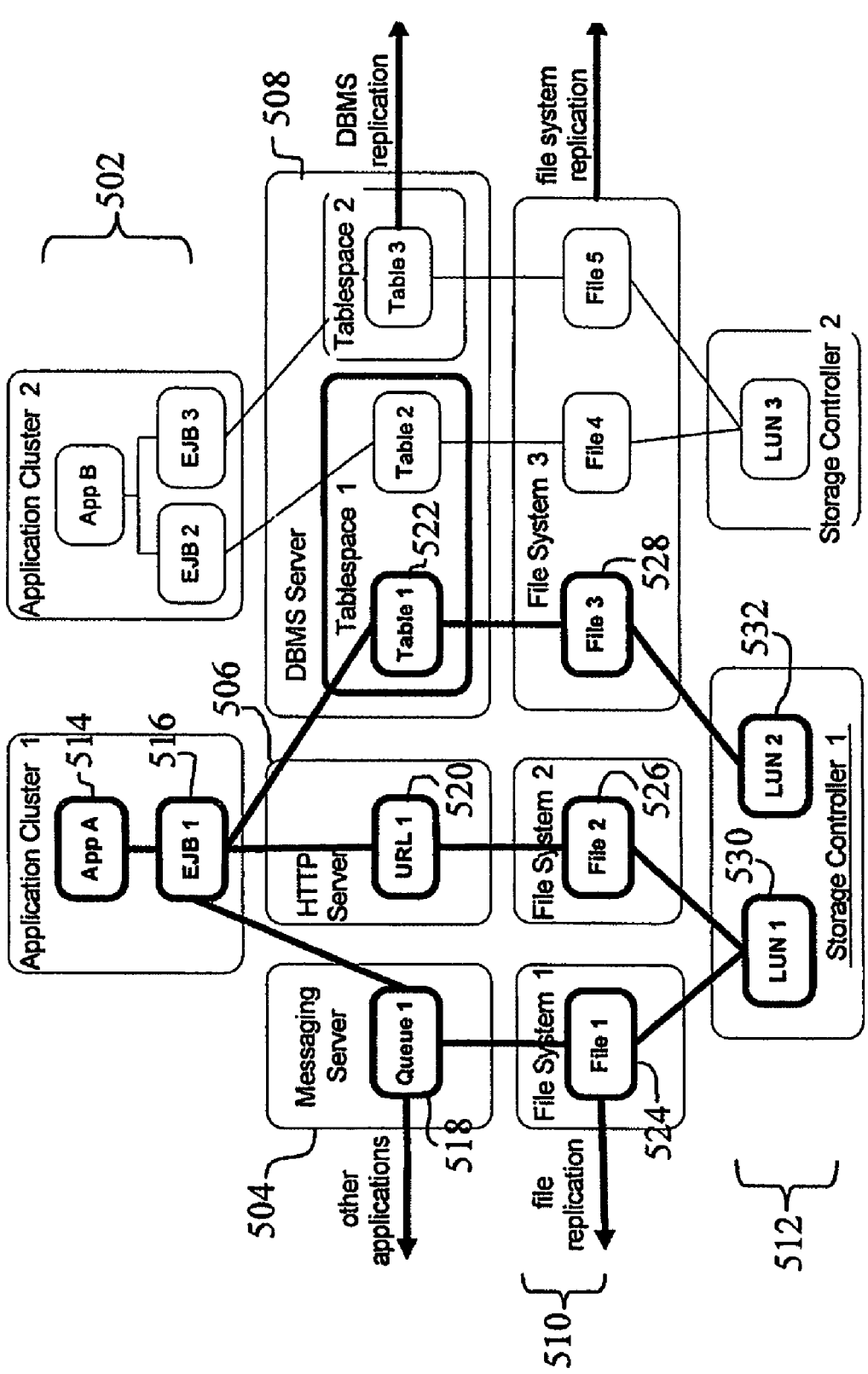
FIG. 5 illustrates an example of a part of a hosting environment shared by two applications and discovery of associations using the method and system of the present disclosure in one embodiment.

FIG. 5 illustrates an example of a part of a hosting environment shared by two applications A and B. Each middleware tier, for example, application tier 502, messaging tier 504, web service (or HTTP) tier 506, database tier 508, file system tier 510, storage system tier 512, etc., implements several instances of data abstractions, for example, enterprise java bean (EJB), messaging queue, uniform resource locator (URL), database table, file, logical unit number (LUN). In addition, each tier is typically partitioned over several physical resources, for example, servers, storage controllers, etc. A database management system (DBMS) instance may be deployed on a collection of physical servers. Back-end storage provider may include a collection of storage controllers 512, for example, storage controller 1 and 2. Applications communicate with each other through messaging, by sharing data, or through ad-hoc mechanisms such as file transfer protocol (ftp). Databases, file systems, and storage controllers may replicate data, potentially all over the globe.

FIG. 5 shows the discovery process in one embodiment. For example, the system and method of the present disclosure can discover that application A 514 depends on Storage Controller 1 but not on Storage Controller 2. This discovery is made, for example, by following application A's data relationships from the application tier 502 (i.e., EJB 1 516) through the messaging 504 (Queue 1 518), HTTP 520 (URL 1 520), and DBMS tiers 508 (Table 1 522), through the file system tier 510 (File 1 524, File 2 526, and File 3 528) and on to the storage tier 512 (LUN 1 530 and LUN 2 532). At each tier, each Data Set in the end-to-end relationships is linked through a Data Scope association to the infrastructure that implements and provides it at that tier. At the last tier (storage), the LUN 1 and LUN2 Data Sets (530 and 532) are associated through Data Scope with Storage Controller 1. It is thus discovered that application A 514 depends only on Storage Controller 1. The above-described example illustrates how the end-to-end nature of application-data relationships, combined with the Data Scope associated at each tier, is used to associated applications with their underlying infrastructure.

The system and method of the present disclosure may be implemented and ran on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for non-disruptively associating applications and middleware components with information technology infrastructure, comprising:

determining first associations by a processor, at each distributed system tier, between instances of data and data-container configuration elements, said first associations pointing to logical subdivision of a data service that is directly responsible for implementing an instance of data;

determining second associations, at said each distributed system tier, between said data-container configuration elements and a server infrastructure, said second associations pointing to a server infrastructure that hosts said data-container configuration elements;

composing third associations, within said each distributed system tier, between said instances of data and said server infrastructure, using said first associations and said second associations;

composing fourth associations, end-to-end, said fourth associations representing dependency of an application using said instances of data to said server infrastructure; and storing at least said third associations and said fourth associations for analyzing system infrastructure, the step of determining the first associations and the second associations being performed using collected system-configuration information without tracing of system activity, and wherein the third associations and fourth associations provide end-to-end relationships among data instances, applications and IT infrastructure through multiple middleware tiers.

2. The method of claim 1, wherein said determining first associations step includes extending a system configuration meta-model to include type associations between data types of said data and data-container configuration types of said data-container configuration elements.

3. The method of claim 1, wherein said determining second associations step includes extending a system configuration meta-model to define Server Mapping type associations and to enable deriving of server dependency for said data-container configuration elements.

4. The method of claim 1, further including:

representing said first associations, said second associations, said third associations and said fourth associations in a system configuration meta-model describing associations among applications, data and a plurality of components of system infrastructure.

5. The method of claim 4, further including:

querying said system configuration meta-model for analyzing the information system infrastructure or planning one or more policies associated with the information system infrastructure or combinations thereof.

6. The method of claim 5, further including:

reporting analysis of the information system infrastructure.

7. The method of claim 1, further including:

representing said first associations, said second associations, said third associations and said fourth associations in a system configuration meta-model using UML representation, said system configuration meta-model describing associations among applications, data and a plurality of components of system infrastructure.

8. The method of claim 7, wherein said UML representation includes:

a data set class corresponding to a data entity in a distributed system;

a data mapping class corresponding to a mapping between a source and a target data set; and a data container configuration class corresponding to a container element that implements a data set.

9. The method of claim 1, further including:

traversing a system configuration meta-model to determine said first associations and said second associations.

10. A system for non-disruptively associating applications and middleware components with information technology infrastructure, comprising:

a processor;

a first computer-implemented module operable to discover first associations, at each distributed system tier, between instances of data and data-container configuration elements, said first associations pointing to logical subdivision of a data service that is directly responsible for implementing an instance of data, said computer-implemented module further operable to discover second associations, at said each distributed system tier, between said data-container configuration elements and a server infrastructure, said second associations pointing to a server infrastructure that hosts said data-container configuration elements;

a second computer-implemented module operable to compose third associations, within said each distributed system tier, between said instances of data and said server infrastructure, using said first associations and said second associations, said second computer-implemented module further operable to compose fourth associations, end-to-end, said fourth associations representing dependency of an application using said instances of data to said server infrastructure; and a data repository operable to store said first, second, third and fourth associations, the discovering of the first associations and the second associations being performed using collected system-configuration information without tracing of system activity, and wherein the third associations and fourth associations provide end-to-end relationships among data instances, applications and IT infrastructure through multiple middleware tiers.

11. The system of claim 10, wherein the system further includes:

a system configuration meta-model representing a plurality of data, application and system components of information technology infrastructure, wherein said computer-implement module traverses said system configuration meta-model to discover said first and second associations.

12. The system of claim 11, wherein said system configuration meta-model is extended to include said first, second, third and fourth associations.

13. The system of claim 12, wherein said extended system configuration meta-model is represented in UML.

14. The system of claim 10, wherein said computer-implemented module includes a crawler program for discovering said first and second associations.

15. A program storage device readable by a machine, tangibly embodying a program of instructions executable by the machine to perform a method of non-disruptively associating applications and middleware components with information technology infrastructure, comprising:

determining first associations, at each distributed system tier, between instances of data and data-container configuration elements, said first associations pointing to logical subdivision of a data service that is directly responsible for implementing an instance of data;

determining second associations, at said each distributed system tier, between said data-container configuration elements and a server infrastructure, said second associations pointing to a server infrastructure that hosts said data-container configuration elements;

composing third associations, within said each distributed system tier, between said instances of data and said server infrastructure, using said first associations and said second associations; and composing fourth associations, end-to-end, said fourth associations representing dependency of an application using said instances of data to said server infrastructure, the step of determining the first associations and the second associations being performed using collected system-configuration information without tracing of system activity, and wherein the third associations and fourth associations provide end-to-end relationships among data instances, applications and IT infrastructure through multiple middleware tiers.

* * * * *